(12) United States Patent
Wang et al.

(10) Patent No.: US 8,432,688 B2
(45) Date of Patent: Apr. 30, 2013

(54) IHS SECURING SYSTEM

(75) Inventors: Chung-Wei Wang, Taipei (TW);
Gurmeet S. Bhutani, Punjab (IN);
Li-Chung Liu, Zhongli (TW)

(73) Assignee: Dell Products L.P., Round Rock, TX (US)

( * ) Notice: Subject to any disclaimer, the term of this patent is extended or adjusted under 35 U.S.C. 154(b) by 294 days.

(21) Appl. No.: 12/832,711

(22) Filed: Jul. 8, 2010

(65) Prior Publication Data
US 2012/0008277 A1 Jan. 12, 2012

(51) Int. Cl.
*G06F 1/16* (2006.01)
*H05K 5/00* (2006.01)
*H05K 7/00* (2006.01)

(52) U.S. Cl.
USPC .................................................. 361/679.57

(58) Field of Classification Search ............. 361/679.02, 361/679.26–679.28, 679.55, 679.57; 16/235, 16/239, 250, 303, 330, 341
See application file for complete search history.

(56) References Cited

U.S. PATENT DOCUMENTS

| | | | | |
|---|---|---|---|---|
| 5,088,156 A | * | 2/1992 | Hosoi | 16/342 |
| 5,507,072 A | * | 4/1996 | Youn | 16/261 |
| 5,687,592 A | * | 11/1997 | Penniman et al. | 70/14 |
| 5,757,616 A | * | 5/1998 | May et al. | 361/679.57 |
| 5,870,281 A | * | 2/1999 | Kim | 361/679.57 |
| 5,960,651 A | * | 10/1999 | Tanisawa | 70/14 |
| 6,034,867 A | * | 3/2000 | Seo | 361/679.27 |
| 6,510,588 B2 | * | 1/2003 | Eromaki | 16/308 |
| 6,644,611 B1 | * | 11/2003 | Tai | 248/292.13 |
| 6,654,233 B2 | * | 11/2003 | Tseng et al. | 361/679.27 |
| 7,283,355 B2 | * | 10/2007 | Han | 361/679.55 |
| 7,424,242 B2 | | 9/2008 | Syring et al. | |
| 7,549,308 B2 | * | 6/2009 | Avganim | 70/58 |
| 7,644,890 B2 | * | 1/2010 | Quincieu | 244/172.6 |
| 7,684,188 B2 | * | 3/2010 | Tzeng et al. | 361/679.57 |
| 7,778,027 B2 | * | 8/2010 | Kitamura et al. | 361/679.57 |
| 7,836,551 B2 | * | 11/2010 | Hung et al. | 16/319 |
| 7,881,054 B2 | * | 2/2011 | Boss et al. | 361/679.57 |
| 7,961,461 B2 | * | 6/2011 | Mesfin et al. | 361/679.57 |
| 7,963,000 B2 | * | 6/2011 | Lai et al. | 16/367 |
| 8,023,252 B2 | * | 9/2011 | Dehaan et al. | 361/679.01 |
| 8,144,462 B2 | * | 3/2012 | Chen | 361/679.57 |
| 8,171,762 B2 | * | 5/2012 | Hsiao et al. | 70/58 |
| 2004/0093690 A1 | * | 5/2004 | Lu et al. | 16/330 |
| 2006/0064850 A1 | * | 3/2006 | Sato et al. | 16/330 |
| 2007/0113379 A1 | * | 5/2007 | Lu et al. | 16/319 |

(Continued)

OTHER PUBLICATIONS

Teodros Mesfin and David Gary Methvin; Secure Media Bay and Media Module; U.S. Appl. No. 12/554,424, filed Sep. 4, 2009; 14 Pages.

*Primary Examiner* — Adrian S Wilson
(74) *Attorney, Agent, or Firm* — Haynes and Boone, LLP

(57) ABSTRACT

A securing system includes a base member. A display member is rotatably coupled to the base member by a shaft. A locking member is operable to move axially relative to the shaft and engage the display member in order to restrict the display member from rotating relative to the base member. The base member and the display member may be part of an information handling system (IHS). A lock including a cable that is coupled to a stationary object may be used to secure the IHS to the stationary object and prevent the use of the IHS by positioning the lock in the base member in order to move the locking member such that it engages the display member.

20 Claims, 9 Drawing Sheets

U.S. PATENT DOCUMENTS

| | | |
|---|---|---|
| 2007/0245778 A1* | 10/2007 | Lu .................................... 70/58 |
| 2008/0058038 A1* | 3/2008 | Murdoch et al. ........... 455/575.3 |
| 2008/0065897 A1 | 3/2008 | Jayaram et al. |
| 2008/0134467 A1* | 6/2008 | Cheng et al. ................... 16/320 |
| 2008/0184529 A1* | 8/2008 | Thom ............................ 16/337 |
| 2008/0186665 A1* | 8/2008 | Kuo .............................. 361/683 |
| 2009/0049876 A1* | 2/2009 | White et al. ..................... 70/58 |
| 2009/0184822 A1* | 7/2009 | Mahaffey et al. .......... 340/568.1 |
| 2010/0050384 A1* | 3/2010 | Zhang et al. .................... 16/303 |
| 2010/0088854 A1* | 4/2010 | Hung et al. ..................... 16/347 |
| 2011/0007475 A1* | 1/2011 | Escamilla et al. ....... 361/679.57 |
| 2011/0043991 A1* | 2/2011 | Yang et al. ............... 361/679.27 |
| 2011/0058331 A1* | 3/2011 | Mesfin et al. ........... 361/679.57 |

* cited by examiner

IHS SECURING SYSTEM

BACKGROUND

The present disclosure relates generally to information handling systems, and more particularly to securing system for an information handling system.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

IHS security is a growing issue, and IHSs may be subject to theft or damage when left unattended or shared with the public. Conventional methods to secure IHSs involve tethering the IHS to a stationary object by securing a lock to the IHS and securing a cable that extends from the lock to the stationary object. While such methods help to prevent the theft of the IHS, they do not help to prevent the theft of data from the IHS or the defacement or damaging of the IHS.

Accordingly, it would be desirable to provide an improved securing system for IHSs.

SUMMARY

According to one embodiment, a securing system includes a base member, a display member rotatably coupled to the base member by a shaft, and a locking member that is operable to move axially relative to the shaft and engage the display member in order to restrict the display member from rotating relative to the base member.

DETAILED DESCRIPTION

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a display device or monitor, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
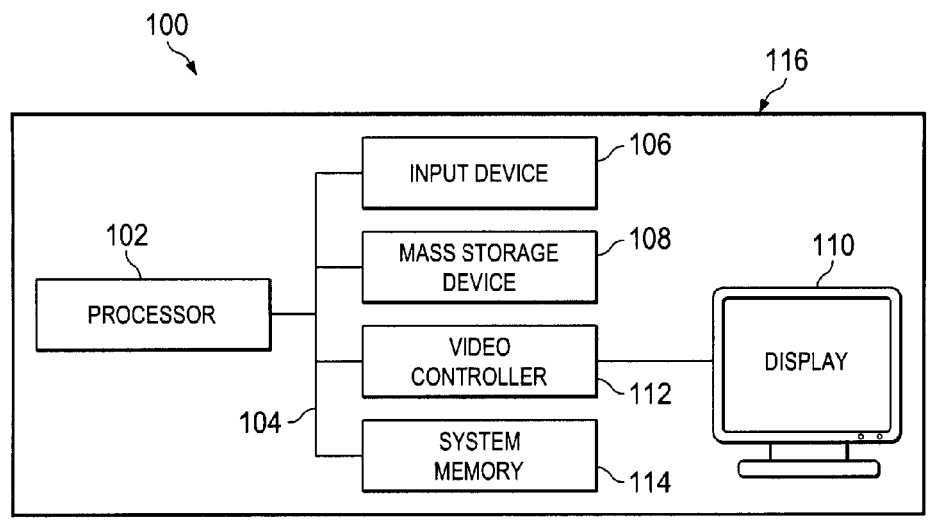
FIG. 1 is a schematic view illustrating an embodiment of an IHS.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
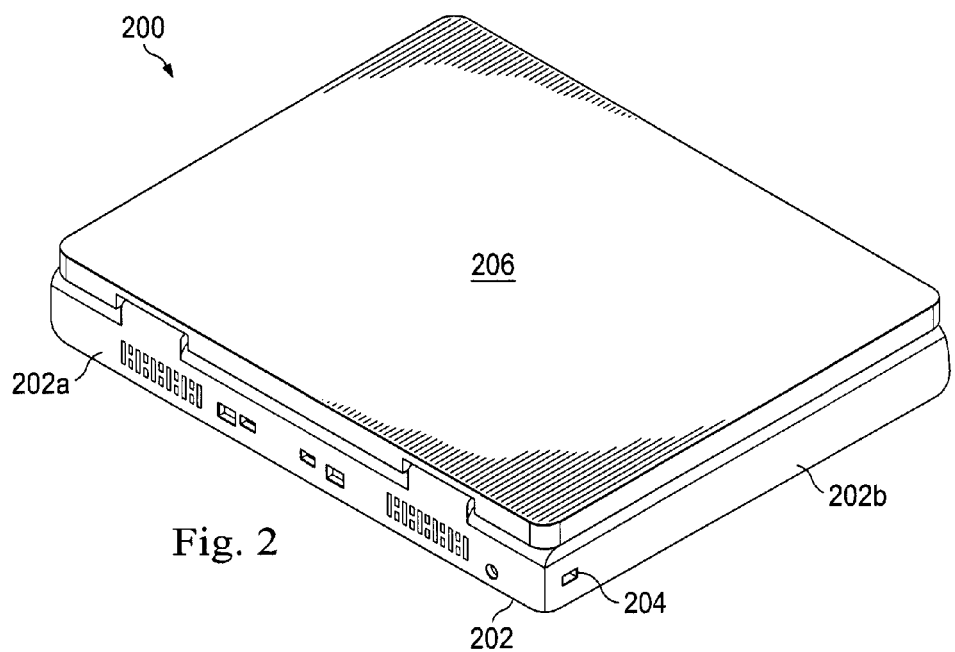
FIG. 2 is a perspective view illustrating an embodiment of an IHS.

Referring now to FIG. 2, an IHS 200, which may be the IHS 100 described above with reference to FIG. 1, is illustrated. In the illustrated embodiment, the IHS 200 is a portable IHS having a chassis base 202 that may be, for example, the chassis 116, described above with reference to FIG. 1, and may house some or all of the components of the IHS 100. The chassis base 202 includes a rear surface 202a and a side surface 202b that extends substantially perpendicularly from the rear surface 202a. In an embodiment, the rear surface 202a and/or the side surface 202b may include connectors and/or other features known in the art which have been omitted for clarity of discussion. A lock passageway 204 is defined by the chassis base 202 and extends into the chassis base 202 from the side surface 202b. A display 206 is rotatably coupled to the chassis base 202 such that the display 206 may be rotated relative to the chassis base 202 from a closed position (illustrated in FIG. 2) to an open position (not shown), as is known in the art.

Figure 3:
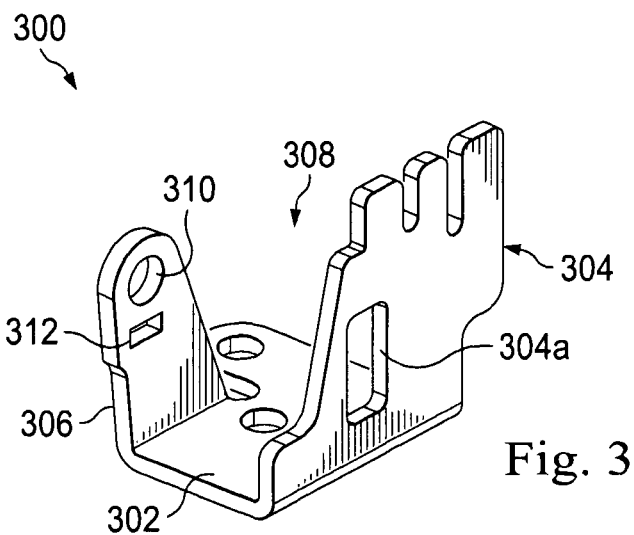
FIG. 3 is a perspective view illustrating an embodiment of a base member used in the IHS of FIG. 2.

Referring now to FIG. 3, a base member 300 is illustrated. In an embodiment, the base member 300 comprises a bracket that is located in the chassis base 202, described above with reference to FIG. 2, adjacent the lock passageway 204 and coupled to the chassis base 202 using methods known in the art. The base member 300 includes a first section 302, a second section 304 that extends substantially perpendicularly from the first section 302 adjacent an edge of the first section 302, and a third section 306 that extends substantially perpendicularly from the first section 302 adjacent an edge of the first section 302 that is opposite the second section 304 such that the third section 306 is substantially parallel to the second section 304. A locking member housing 308 is defined between the first section 302, the second section 304, and the third section 306. The second section 304 of the base member 300 defines a lock passageway 304a that extends through the second section 304 of the base member 300. In an embodiment, the base member 300 is located in the chassis base 200 such that the lock passageway 304a on the base member 300 is positioned adjacent the lock passageway 204 on the chassis base 202 and provides a passageway through which a lock may enter the locking member housing 308, described in further detail below. The third section 306 of the base member 300 defines a circular shaft passageway 310 and a rectangular locking member passageway 312 that each extend through the third section 306 and that are located in a spaced apart orientation from each other on the third section 306 of the base member 300.

Figure 4:
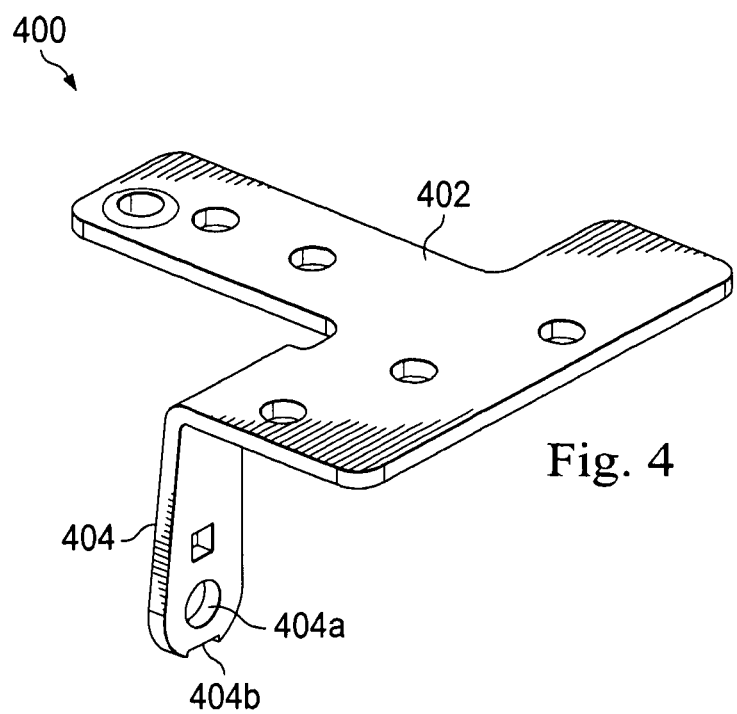
FIG. 4 is a perspective view illustrating an embodiment of a display member used in the IHS of FIG. 2.

Referring now to FIG. 4, a display member 400 is illustrated. In an embodiment, the display member 400 comprises a bracket that is located in the display 206, described above with reference to FIG. 2, adjacent the lock passageway 204 on the chassis base 202, and coupled to the display 206 using methods known in the art. The display member 400 includes a first section 402 and a second section 404 that extends substantially perpendicularly from the first section 402. In an embodiment, the first section 402 of the display member 400 may be coupled to structural members in the display 206. The second section 404 of the display member 400 defines a shaft passageway 404a that extends through the second section 404 of the display member 400. The second section 404 of the display member 400 also defines a locking member channel 404b that is spaced apart from the shaft passageway 404a and that extends into the second section 404 from an edge of the second section 404.

Figure 5A:
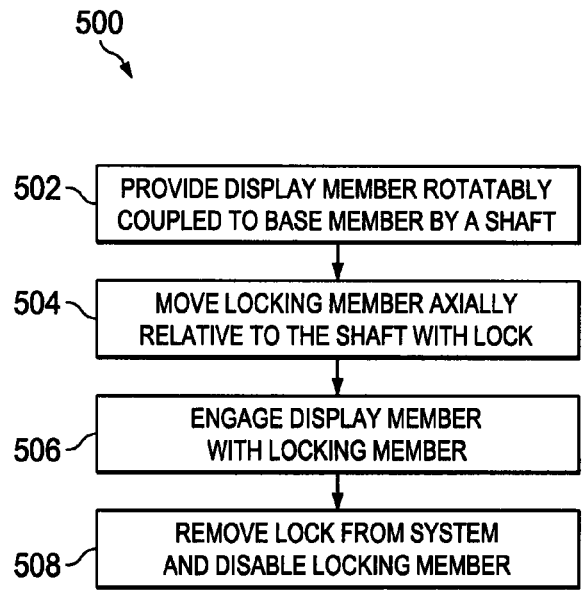
FIG. 5a is a flow chart of an embodiment of a method for securing an IHS.
Figure 5B:
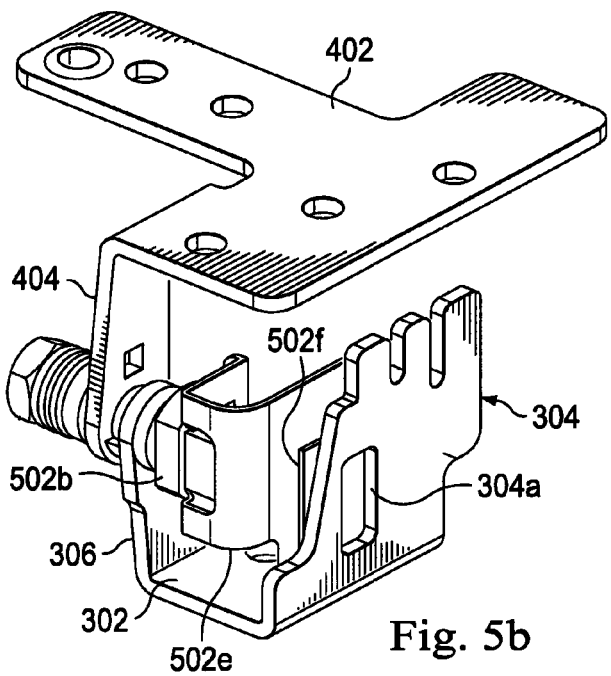
FIG. 5b is a perspective view illustrating an embodiment of the display member of FIG. 4 rotatably coupled to the base member of FIG. 3 by a shaft, and a locking member moveably coupled to the shaft.
Figure 5C:
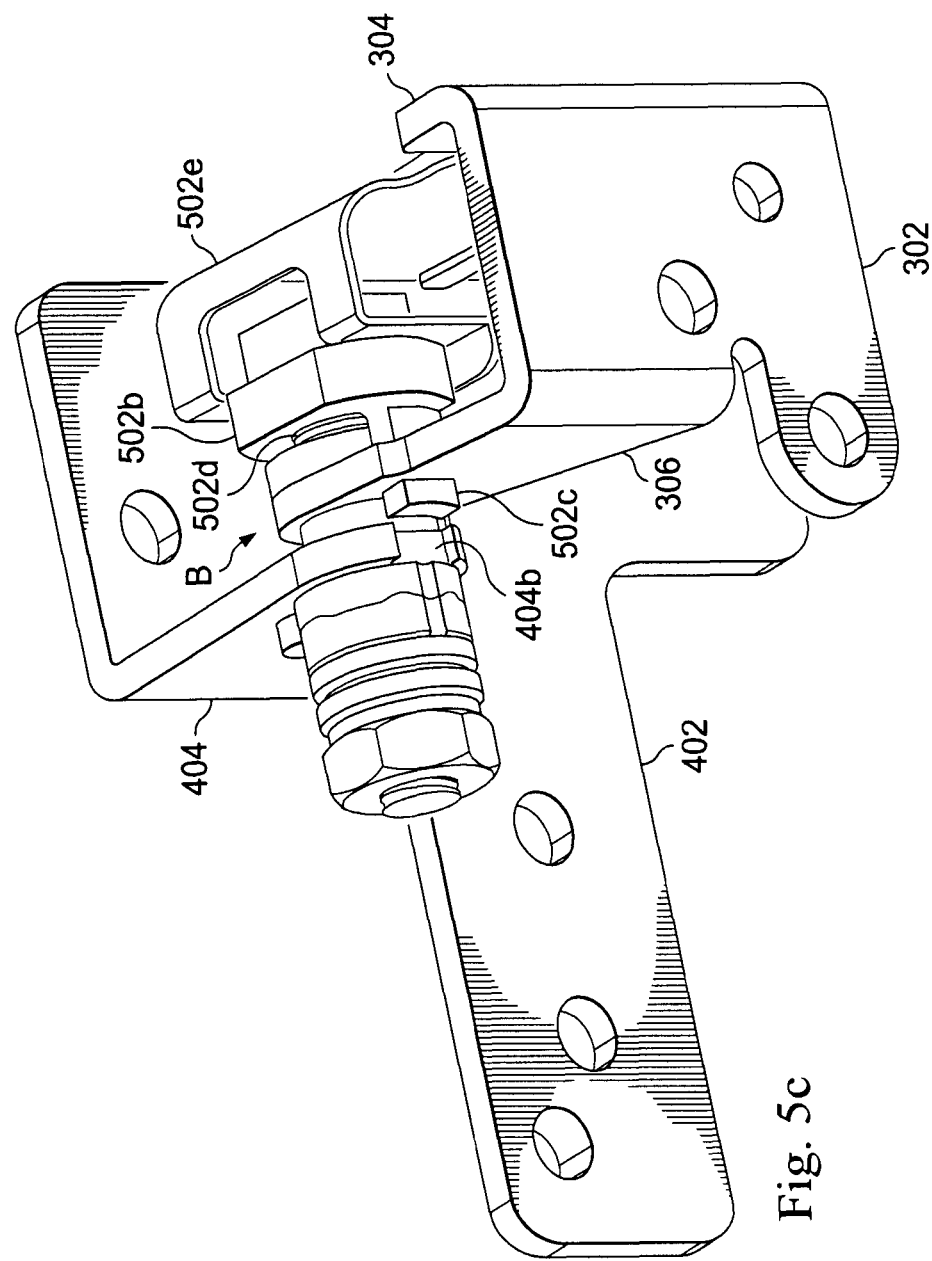
FIG. 5c is a perspective view illustrating an embodiment of the display member of FIG. 4 rotatably coupled to the base member of FIG. 3 by a shaft, and a locking member moveably coupled to the shaft.
Figure 5D:
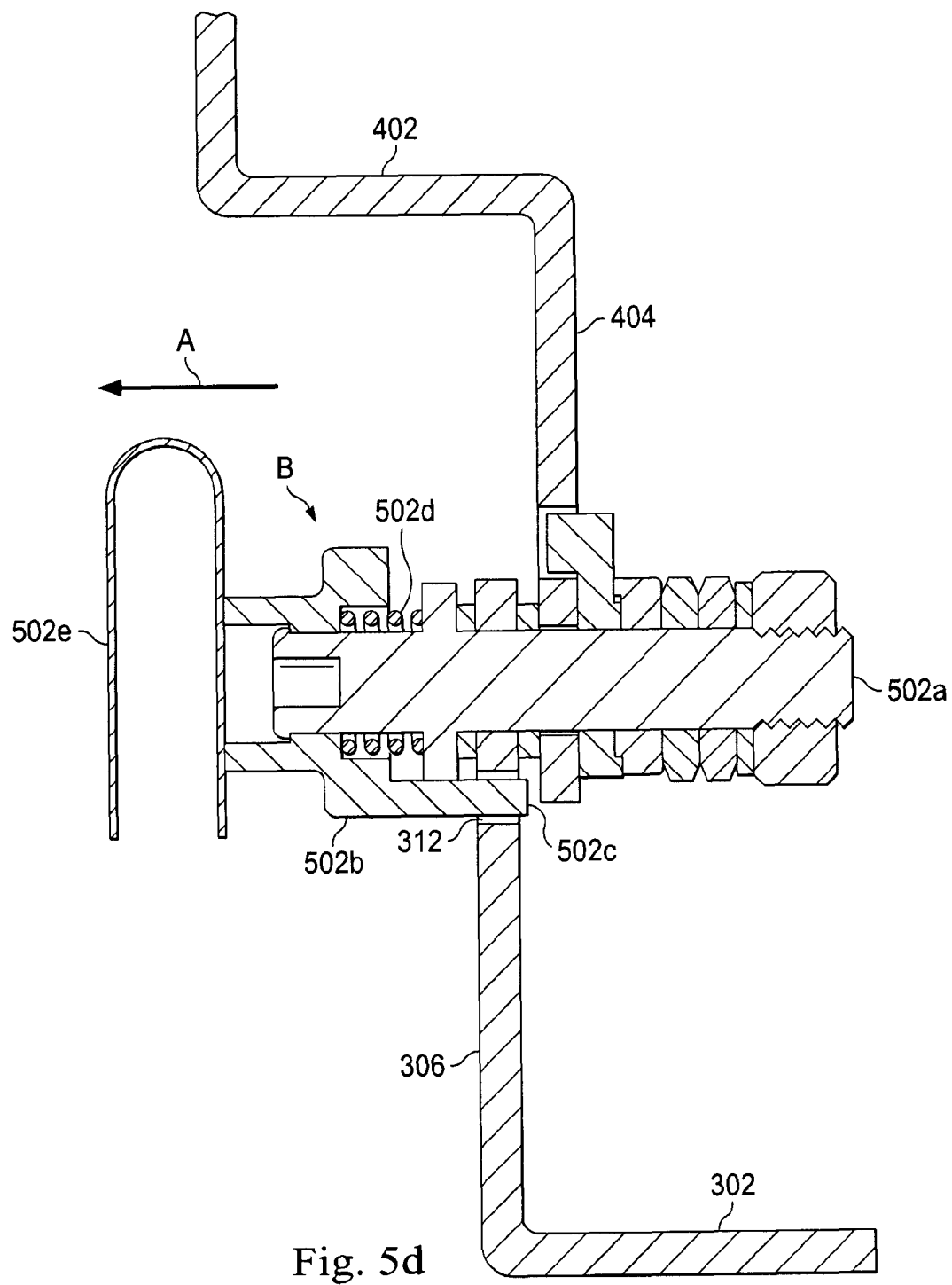
FIG. 5d is a cross-sectional view illustrating an embodiment of the display member of FIG. 4 rotatably coupled to the base member of FIG. 3 by a shaft, and a locking member moveably coupled to the shaft.

Referring now to FIGS. 3, 4, 5a, 5b, 5c and 5d, a method 500 for securing an IHS is illustrated. The method 500 begins at block 502 where a display member is rotatably coupled to a base member by a shaft. A shaft 502a is provided and positioned such that the shaft 502a extends through the circular shaft passageway 310 on the base member 300 and the shaft passageway 404a on the display member 400 such that the display member 400 is positioned adjacent the base member 300, as illustrated in FIG. 5d. A locking member 502b that includes a distal end 502c is movably coupled to the shaft 502a such that the locking member 502b may move axially relative to the shaft 502a along the axis of rotation of the shaft 502a. A spring 502d resiliently biases the locking member 502b along the axis of rotation of the shaft 502a and away from the display member 400 in a direction A. In the illustrated embodiment, the distal end 502c of the locking member 502b extends through the rectangular locking member passageway 312 on the base member 300 when the locking member 502b is in a biased position B, as illustrated in FIGS. 5c and 5d. However, one of skill in the art will recognize that the distal end 502c of the locking member 502b may include different biased positions while remaining within the scope of the present disclosure. A force transmitting member 502e is coupled to the locking member 502b and, in the illustrated embodiment, includes a U-shaped spring. In an embodiment, a sheet of material 502f may be located between the force transmitting member 502e and the lock passageway 304a on the base member 300 for cosmetic and/or wear resistance purposes.

Figure 5E:
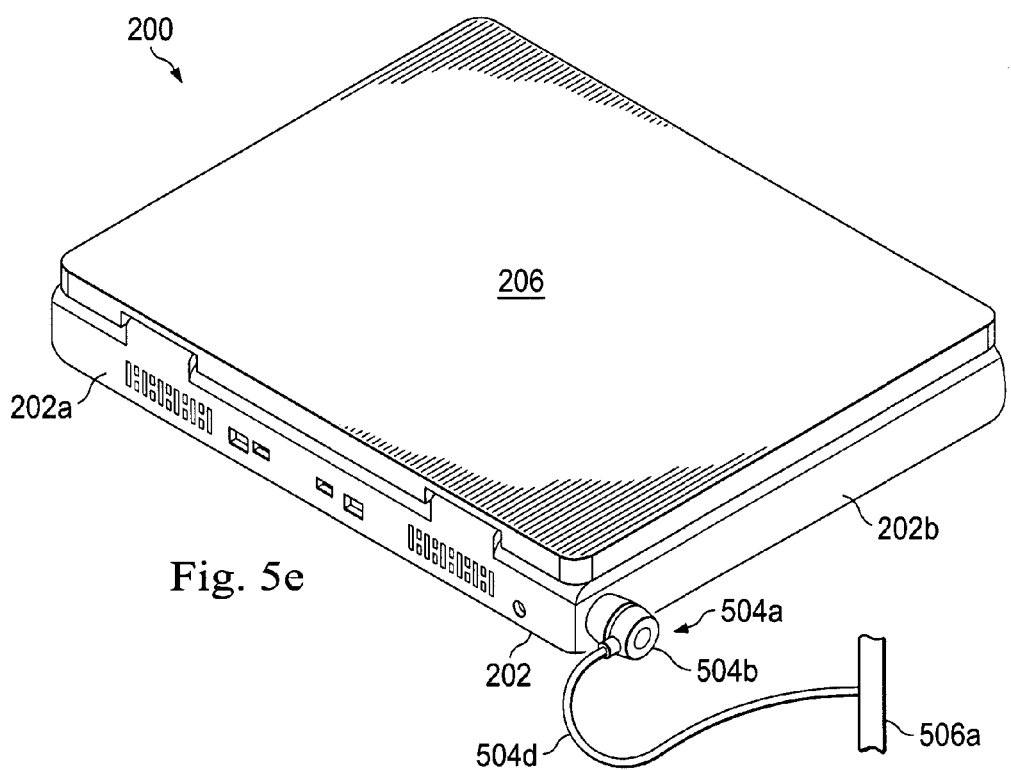
FIG. 5e is a perspective view illustrating an embodiment of a lock secured to the IHS of FIG. 2.
Figure 5F:
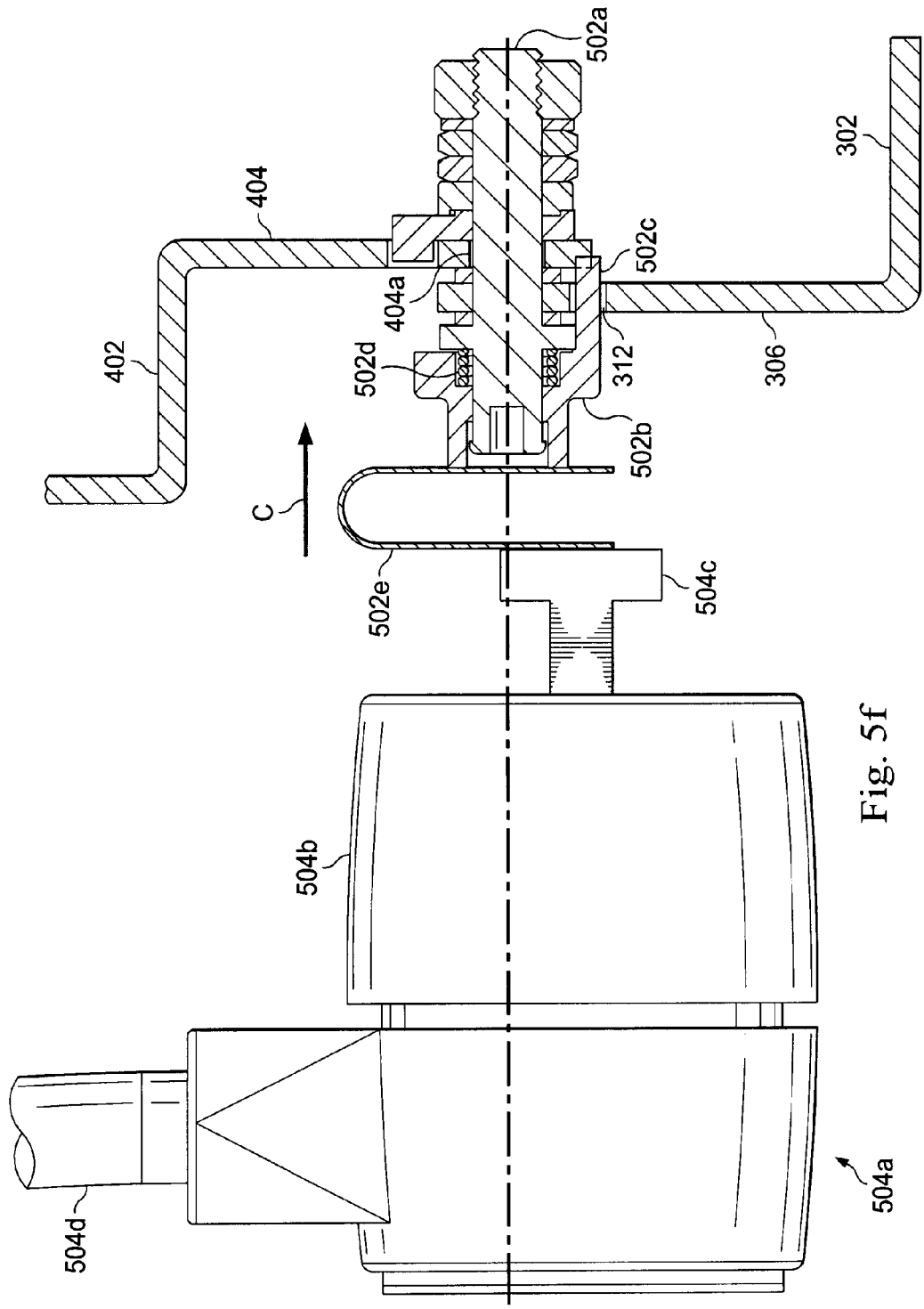
FIG. 5f is a cross-sectional view illustrating an embodiment of the lock of FIG. 5e providing a force on the locking member of FIGS. 5b, 5c and 5d in order to restrict rotation of the display member of FIG. 4 relative to the base member of FIG. 3.
Figure 5G:
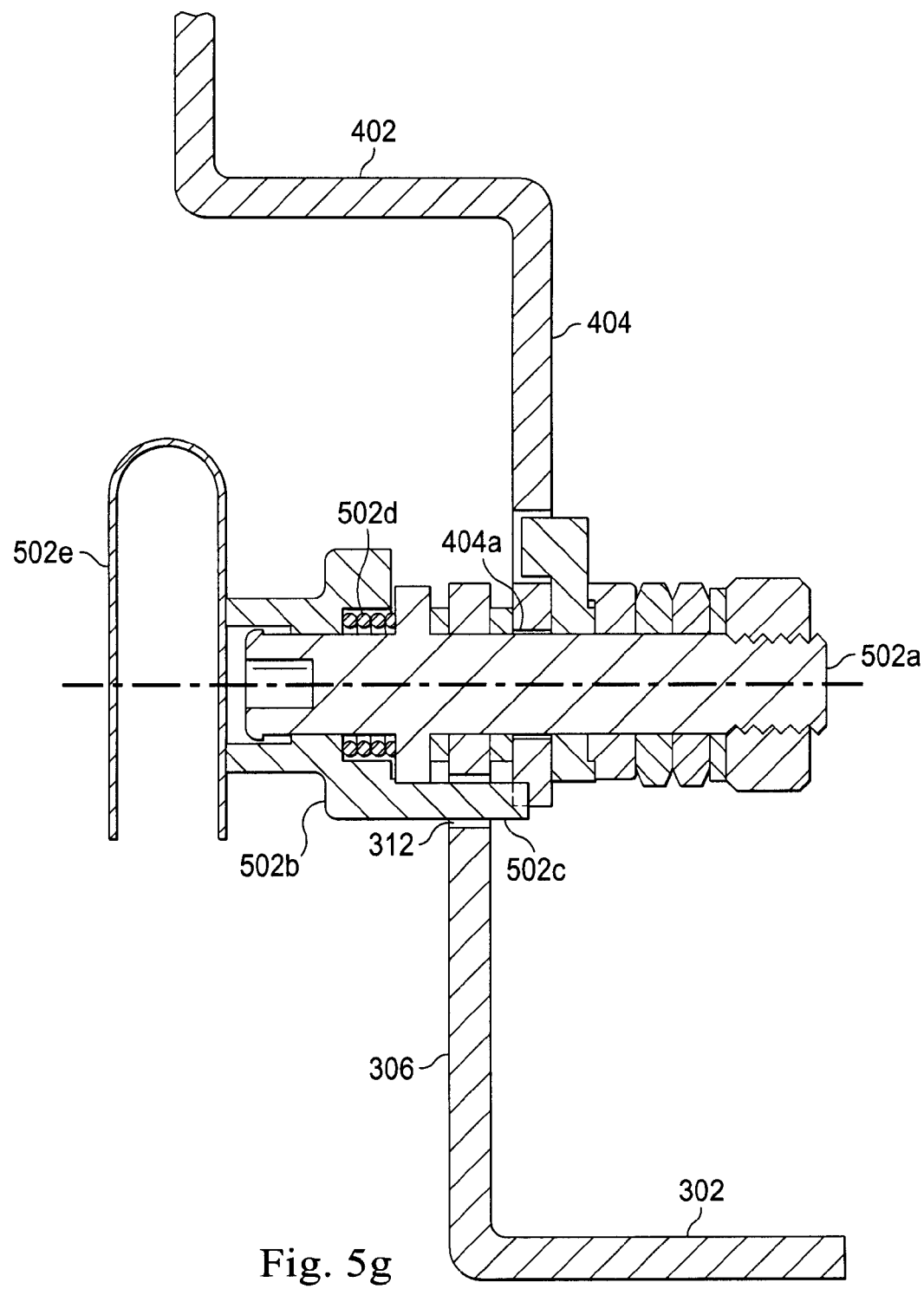
FIG. 5g is a cross-sectional view illustrating an embodiment of the locking member of FIGS. 5b, 5c and 5d restricting rotation of the display member of FIG. 4 relative to the base member of FIG. 3.

Referring now to FIGS. 2, 3, 4, 5a, 5e, 5f and 5g, the method 500 then proceeds to blocks 504 and 506 where the locking member is moved axially relative to the shaft with a lock such that the locking member engages the display member. A lock 504a is provided that includes a base 504b, an activating end 504c that extends from the base 504a, and a cable 504d that extends from base 504a. In an embodiment, the lock 504a may be a Kensington brand lock available a www.kensington.com and/or a variety of other locks known in the art. The cable 504d on the lock 504a may be coupled to a stationary object 506a, as illustrated in FIG. 5e. The base 504b on the lock 504a may then be positioned adjacent the side surface 202b of the IHS 200 such that the activating end 504c of the lock 504a extends through the lock passageway 204 on the chassis base 202 and the lock passageway 304a on the base member 300. As the activating end 504c of the lock 504a moves through the lock passageway 304a on the base member 300, it engages and provides a force on the force transmitting member 502e. The force transmitting member 502e transmits the force from the activating end 504c of the lock 504a to the locking member 502b, which causes the spring 502d to compress and the locking member 502b to move axially relative to the shaft 502a in a direction C, illustrated in FIG. 5f. The locking member 502b moves axially in the direction C until the distal end 502c of the locking member 502b becomes positioned in the locking member channel 404b on the display member 400, as illustrated in FIGS. 5f and 5g. With the distal end 502c of the locking member 502b positioned in the locking member channel 404b, the rotation of the display member 400 relative to the base member 300 is restricted due to the engagement of the display member 400 and the distal end 502c of the locking member 502b. As such, attempts to rotate the display 206 relative to the chassis base 202 are restricted due to the coupling of the display member 400 to the display 206 and the base member 300 to the chassis base 202. The lock 504a includes components known in the art that allow the lock 504a to be secured to the chassis base 202 such that the activation end 504c of the lock 504a may not be removed from the chassis base 202 through the lock passageways 204 or 304a. By restricting the display 206 from rotating relative to the chassis base 202, access to system power switches, input devices, and other components of the IHS 200 on the chassis base 202 and the display 206 is restricted, thereby securing the components and data of the IHS 200. Thus, a system and method are provided that allow the IHS 200 to be secured to the stationary object 506a while also securing data and components of the IHS 200 by preventing the display 206 from being opened. Furthermore, additional locking member channels may be defined by the display member 400 such that, if the locking member 502d is activated after the display 206 has been rotated to relative to the chassis base 202 to an open position, the display 206 may either be locked in its open position or allowed a range of rotation that restricts the display 206 from being rotated into the closed position illustrated in FIG. 2.

Figure 5H:
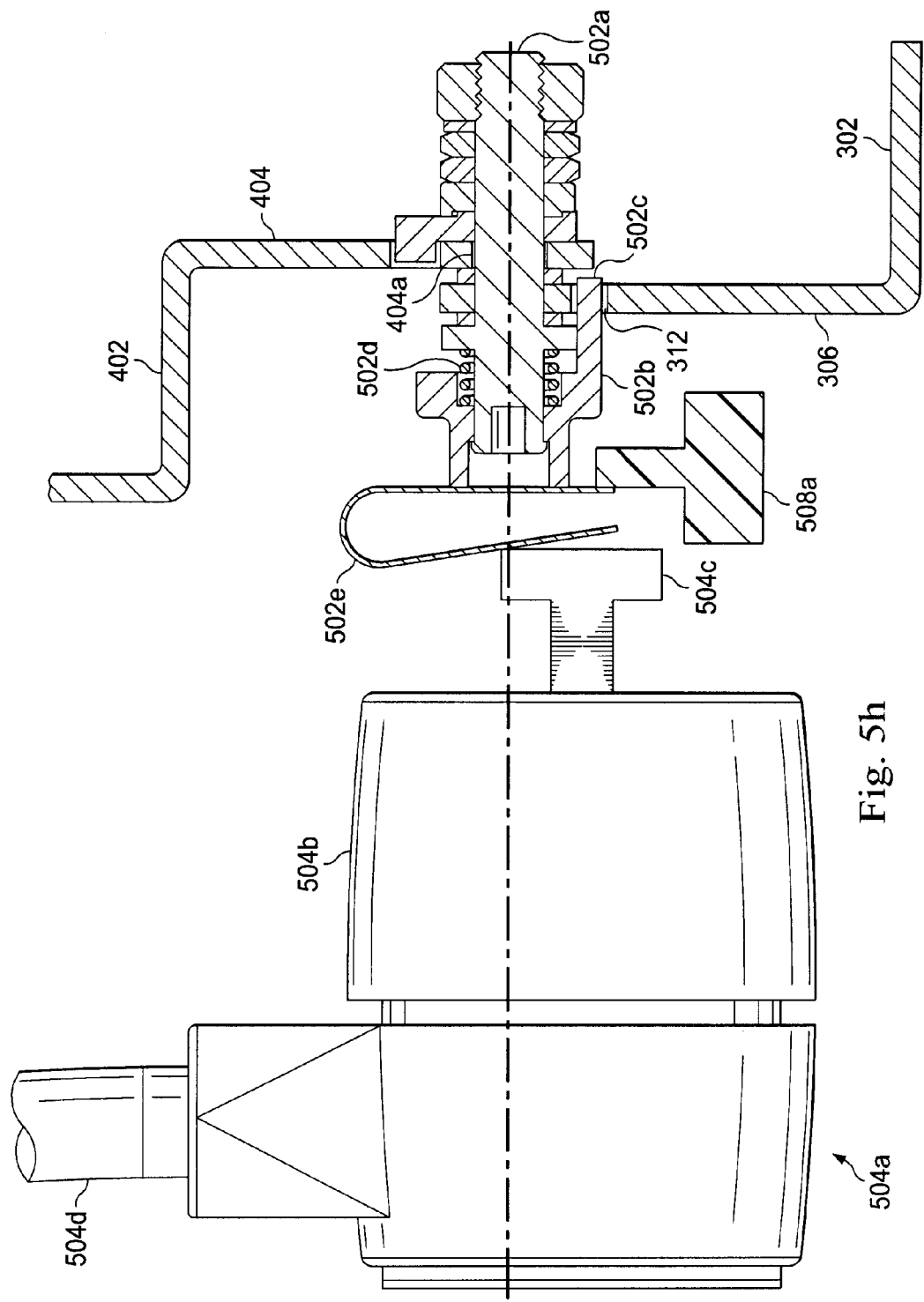
FIG. 5h is a cross-sectional view illustrating an embodiment of a disabling member preventing the lock of FIG. 5e from providing a force on the locking member of FIGS. 5b, 5c and 5d such that rotation of the display member of FIG. 4 relative to the base member of FIG. 3 is not restricted.

Referring now to FIGS. 2, 3, 4, 5a, 5d, 5e and 5h, the method 500 then proceeds to block 508 where the lock is removed from the system and the locking member is disabled. The lock 504a may be removed from the chassis base 202 by first deactivating the components that secure the activation end 504c of the lock 504a in the chassis base 202. The activation end 504c of the lock 504a may then be removed from the chassis base 202 through the lock passageways 204 and 304a. Removal of the activation end 504c from the chassis base 202 allows the spring 502d to resiliently bias the locking member 502b in the direction A such that the distal end 502c of the locking member 502b is no longer positioned in the locking member channel 404b on the display member 400, as illustrated in FIG. 5d. A disabling member 508a is then moved adjacent the force transmitting member 502e, as illustrated in FIG. 5h. In an embodiment, the disabling member 508 may be actuatable into the position adjacent the force transmitting member 502e from a surface of the chassis base 202, the display 206, and/or using a variety of other techniques known in the art. With the disabling member 508 located adjacent the force transmitting member 502e, the display member 400 is free to rotate relative to the base member 300 about the axis of the shaft 502a. The base 504b on the lock 504a may then be positioned adjacent the side surface 202b of the IHS 200 such that the activating end 504c of the lock 504a extends through the lock passageway 204 on the chassis base 202 and the lock passageway 304a on the base member 300. As the activating end 504c of the lock 504a moves through the lock passageway 304a on the base member 300, it engages and provides a force on the force transmitting member 502e. However, the disabling member 508a will engage the force transmitting member 502e and prevent the force transmitting member 502e from transmitting the force from the activating end 504c of the lock 504a to the locking member 502b, as illustrated in FIG. 5h. As noted above, the lock 504a includes components known in the art that allow the lock 504a to be secured to the chassis base 202 such that the activation end 504c of the lock 504a may not be removed from the chassis base 202 through the lock passageways 204 and 304a. Thus, the system and method also allow the display rotation locking mechanism to be disabled such that the IHS 200 may be secured to the stationary object 506a while also allowing the display 206 to be rotated between an opened and a closed position.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A securing system, comprising:
   a base member;
   a display member rotatably coupled to the base member by a shaft; and
   a locking member that is coupled to the shaft and operable to move axially relative to the shaft such that the locking member engages both the base member and the display member in order to restrict the display member from rotating relative to the base member.

2. The system of claim 1, wherein the display member defines a locking member channel that is operable to receive the locking member such that the locking member engages the display member in response to the locking member moving axially relative to the shaft.

3. The system of claim 1, wherein the locking member is resiliently biased away from engagement with the display member.

4. The system of claim 1, wherein the base member defines a passageway and the locking member extends through the passageway, and wherein the locking member moves relative to the passagewway and into engagement with the display member when moved axially relative to the shaft.

5. The system of claim 1, further comprising:
   a force transmitting member coupled to the locking member and operable to transmit the force from a lock to the locking member.

6. The system of claim 5, wherein the force transmitting member comprises a spring.

7. The system of claim 5, further comprising:
   a disabling member that is operable to prevent the force transmitting member from transmitting the force from the lock to the locking member.

8. An information handling system, comprising:
   a chassis base comprising a chassis base member;
   a processor housed in the chassis base;
   a memory coupled to the processor;
   a display member coupled to the chassis base member by a shaft; and
   a locking member that is coupled to the shaft and operable to move axially relative to the shaft such that the locking member engages both the chassis base member and the display member in order to restrict the display member from rotating relative to the chassis base member.

9. The system of claim 8, wherein the display member defines a locking member channel that is operable to receive the locking member such that the locking member engages the display member in response to the locking member moving axially relative to the shaft.

10. The system of claim 8, wherein the locking member is resiliently biased away from engagement with the display member.

11. The system of claim 8, wherein the chassis base member defines a passageway and the locking member extends through the passageway, and wherein the locking member moves relative to the passageway and into engagement with the display member when moved axially relative to the shaft.

12. The system of claim 8, further comprising:
   a force transmitting member coupled to the locking member and operable to transmit the force from a lock to the locking member.

13. The system of claim 12, wherein the force transmitting member comprises a spring.

14. The system of claim 12, further comprising:
a disabling member that is operable to prevent the force transmitting member from transmitting the force from the lock to the locking member.

15. The system of claim 8, wherein the chassis base defines a lock passageway and the system further comprises:
a lock extending through the lock passageway and providing a force to the locking member that causes the locking member to move axially relative to the shaft and engage the display member.

16. The system of claim 15, further comprising:
a cable extending from the lock and coupled to a stationary object.

17. A method for securing an information handling system, comprising:
providing a base member defining a lock passageway, and a display member rotatably coupled to the base member by a shaft;
moving a locking member that is coupled to the shaft axially relative to the shaft by positioning a lock in the lock passageway such that the lock engages the locking member; and
engaging both the base member and the display member with the locking member in response to moving the locking member axially relative to the shaft, wherein the engagement of the base member and the display member with the locking member restricts the display member from rotating relative to the base member.

18. The method of claim 17, further comprising:
coupling a cable that extends from the lock to a stationary object.

19. The method of claim 17, further comprising:
resiliently biasing the locking member away from the display member, wherein the engagement of the lock and the locking member overcomes the resilient biasing to move the locking member towards the display member.

20. The method of claim 17, further comprising:
disengaging the locking member and the display member by removing the lock from the lock passageway to disengage the lock from the locking member; and
activating a disabling member in order to prevent the locking member from engaging the display member when the lock is positioned in the lock passageway such that the lock engages the locking member.

* * * * *